(12) United States Patent
Ma et al.

(10) Patent No.: US 10,409,723 B2
(45) Date of Patent: Sep. 10, 2019

(54) MULTI-CORE PROCESSOR SUPPORTING CACHE CONSISTENCY, METHOD, APPARATUS AND SYSTEM FOR DATA READING AND WRITING BY USE THEREOF

(71) Applicant: Alibaba Group Holding Limited, George Town, Grand Cayman (KY)

(72) Inventors: Ling Ma, Hangzhou (CN); Wei Zhou, Hangzhou (CN); Lei Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 5 days.

(21) Appl. No.: 14/964,296

(22) Filed: Dec. 9, 2015

(65) Prior Publication Data
US 2016/0170886 A1 Jun. 16, 2016

(30) Foreign Application Priority Data

Dec. 10, 2014 (CN) .......................... 2014 1 0756732

(51) Int. Cl.
*G06F 12/0815* (2016.01)
*G06F 12/0811* (2016.01)
*G06F 12/084* (2016.01)

(52) U.S. Cl.
CPC ........ *G06F 12/0815* (2013.01); *G06F 12/084* (2013.01); *G06F 12/0811* (2013.01); *G06F 2212/1028* (2013.01); *G06F 2212/283* (2013.01); *G06F 2212/621* (2013.01); *Y02D 10/13* (2018.01)

(58) Field of Classification Search
CPC ............ G06F 12/0815; G06F 12/0811; G06F 12/084; G06F 2212/283; G06F 2212/621
See application file for complete search history.

(56) References Cited

U.S. PATENT DOCUMENTS

| | | | | |
|---|---|---|---|---|
| 4,442,487 | A | * 4/1984 | Fletcher | .............. G06F 12/0811 711/122 |
| 5,479,624 | A | * 12/1995 | Lee | ..................... G06F 12/0607 711/1 |
| 7,805,575 | B1 | 9/2010 | Agarwal et al. | |
| 7,853,755 | B1 | 12/2010 | Agarwal et al. | |
| 8,607,004 | B2 | 12/2013 | Anderson | |
| 8,615,633 | B2 | 12/2013 | Solihin | |
| 8,621,184 | B1 | 12/2013 | Radhakrishnan et al. | |

(Continued)

FOREIGN PATENT DOCUMENTS

| | | |
|---|---|---|
| CN | 101706755 A | 5/2010 |
| CN | 101958834 A | 1/2011 |

(Continued)

*Primary Examiner* — Michael Krofcheck

(57) ABSTRACT

A multi-core processor supporting cache consistency, a method and apparatus for data writing, and a method and apparatus for memory allocation, as well as a system by use thereof. The multi-core processor supporting cache consistency includes a plurality of cores, the plurality of cores corresponding to respective local caches. A local cache of a core of the plurality of cores is responsible for caching data in a different range of addresses in a memory space and a core of the plurality of cores accesses data in a local cache of another core of the plurality of core via an interconnect bus.

27 Claims, 7 Drawing Sheets

(56) References Cited

U.S. PATENT DOCUMENTS

| | | | |
|---|---|---|---|
| 8,635,405 B2 | 1/2014 | Nishihara et al. | |
| 8,700,851 B2* | 4/2014 | Togawa | G06F 8/4442 |
| | | | 711/118 |
| 8,751,737 B2 | 6/2014 | Bu et al. | |
| 8,799,579 B2 | 8/2014 | Hady et al. | |
| 8,806,129 B2 | 8/2014 | Duvalsaint et al. | |
| 8,874,855 B2 | 10/2014 | Conte | |
| 8,892,819 B2 | 11/2014 | Kurihara et al. | |
| 8,892,924 B2 | 11/2014 | Balasubramanian et al. | |
| 8,892,929 B2 | 11/2014 | Balasubramanian et al. | |
| 8,904,114 B2 | 12/2014 | Kruglick | |
| 8,914,690 B2 | 12/2014 | Vorbach et al. | |
| 8,928,897 B2 | 1/2015 | Silverbrook | |
| 8,943,287 B1 | 1/2015 | Miller et al. | |
| 8,948,267 B1 | 2/2015 | Khan et al. | |
| 8,996,811 B2 | 3/2015 | Yamauchi et al. | |
| 8,996,820 B2 | 3/2015 | Suzuki et al. | |
| 9,086,973 B2 | 7/2015 | Vorbach | |
| 9,098,414 B2 | 8/2015 | Suzuki et al. | |
| 9,122,800 B1 | 9/2015 | Huddar et al. | |
| 9,208,093 B2 | 12/2015 | Conte et al. | |
| 9,229,865 B2 | 1/2016 | Solihin | |
| 9,235,550 B2 | 1/2016 | Hady et al. | |
| 9,244,853 B2 | 1/2016 | Kang et al. | |
| 2003/0131202 A1* | 7/2003 | Khare | G06F 12/0831 |
| | | | 711/146 |
| 2007/0143546 A1* | 6/2007 | Narad | G06F 12/084 |
| | | | 711/130 |
| 2007/0168620 A1 | 7/2007 | Leonard et al. | |
| 2008/0059711 A1* | 3/2008 | McKeen | G06F 12/0804 |
| | | | 711/129 |
| 2010/0146180 A1* | 6/2010 | Takahashi | G06F 13/4022 |
| | | | 710/302 |
| 2010/0325348 A1* | 12/2010 | Rafizadeh | G06F 3/061 |
| | | | 711/103 |
| 2011/0087859 A1* | 4/2011 | Mimar | G06F 9/30043 |
| | | | 712/4 |
| 2012/0079032 A1* | 3/2012 | Vash | G06F 15/17325 |
| | | | 709/206 |
| 2012/0137075 A1* | 5/2012 | Vorbach | G06F 9/526 |
| | | | 711/122 |
| 2013/0246825 A1* | 9/2013 | Shannon | G06F 1/3275 |
| | | | 713/324 |
| 2014/0032854 A1* | 1/2014 | Lih | G06F 12/0837 |
| | | | 711/141 |
| 2014/0033217 A1 | 1/2014 | Vajda et al. | |
| 2014/0040552 A1 | 2/2014 | Rychlik et al. | |
| 2014/0040557 A1* | 2/2014 | Frey | G06F 12/084 |
| | | | 711/130 |
| 2014/0281248 A1 | 9/2014 | Alameldeen et al. | |
| 2014/0289711 A1* | 9/2014 | Usui | G06F 11/362 |
| | | | 717/129 |
| 2014/0297960 A1* | 10/2014 | Cudennec | G06F 12/0831 |
| | | | 711/130 |
| 2014/0297969 A1* | 10/2014 | Moroo | G06F 1/3275 |
| | | | 711/148 |
| 2015/0186292 A1* | 7/2015 | Sundaram | G06F 12/1045 |
| | | | 711/207 |

FOREIGN PATENT DOCUMENTS

| | | |
|---|---|---|
| CN | 102591800 A | 7/2012 |
| CN | 104360981 A | 2/2015 |
| CN | 104462007 A | 3/2015 |

\* cited by examiner

MULTI-CORE PROCESSOR SUPPORTING CACHE CONSISTENCY, METHOD, APPARATUS AND SYSTEM FOR DATA READING AND WRITING BY USE THEREOF

CROSS REFERENCE TO RELATED APPLICATION

This application claims the benefits to Chinese Patent Application No. 201410756732.3, filed on Dec. 10, 2014, which is incorporated herein by reference in its entirety.

TECHNICAL FIELD

The present invention relates generally to multi-core processors, and more particularly to multi-core processors supporting cache consistency. The instant application provides for, by use of a multi-core processor, a method and apparatus for data reading, a method and apparatus for data writing, and a method and apparatus for memory allocation, as well as a system and a multi-core processor supporting cache consistency.

BACKGROUND

During the development of computer technologies, a main memory (i.e., physical memory or memory as generally referred to) stores and retrieves data at a speed always much slower than that of a CPU, thereby not maximizing the high processing power of a CPU. In order to buffer the ill-matched processing speeds of a CPU and a main memory, a high speed cache (i.e., cache as generally referred to) can be introduced therebetween.

Although the storage capacity of a cache tends to be much smaller than that of a main memory, it is capable of storing and retrieving data at a speed matching that of a CPU. According to the principle of locality of programs, the instructions and data currently accessed by a CPU are likely to be accessed multiple times afterwards, and the same holds true for the neighboring memory sections. Therefore, computer hardware usually is designed to automatically load data in memory sections related to the data that are currently accessed by a CPU into a cache such that, when the CPU is to access data in the memory, it accesses the cache first. If there is a cache miss, the CPU then accesses the memory. Using this approach, a CPU's direct access to the memory can be reduced to a maximal extent, thereby enhancing the overall processing speed of a computer system.

In recent years, computer systems have evolved in the direction of multi-core processors. A typical architecture of such a system is shown in FIG. 1. Computer system 10 includes a plurality of CPU cores 12_0, 12_1, ..., 12_n-1, where n is a natural number greater than or equal to 1. Each core stores data to be accessed in its respectively caches, for example, L1 caches 14_1, 14_2, 14_3, ..., 14_n and L2 caches 16_1, 16_2, 16_3, ..., 16_n, for the purpose of speeding up CPU core processing. Because any data might be stored in this manner by private caches of multiple cores, a shared cache is introduced to reduce cache redundancy. Usually, the system 10 also includes a cache index 22 and a last level of cache (LLC) 18, which is shared by all the cores before accessing a memory controller 20 in the system. Such a shared cache can provide for sharing data amongst multiple cores, reducing communication delay, at the same time reducing data redundancy, enhancing cache space usage efficiency.

Due to the fact that private caches lead to caching multiple copies of a same data, in order to assure data consistency, present techniques usually utilize an index based consistency protocol. For example, a cache index can be utilized to track data in different private caches of different cores, recording which private caches have a copy of which data, and it is based upon such a cache index data read and data write operations will be executed. For example, when a CPU core needs to write data to its corresponding private cache, it first consults the cache index with regard to which other private caches also store a copy of the data, notifies those privates caches to set the corresponding data as NULL, then executes the data write operation so as to assure cache data consistency.

However, there are problems with the above described system and the cache index based consistency protocol. First, due the cache index keeping track of data at the private caches of different CPUs, increased number of CPU cores results in increased size of a cache index, occupying more cache space and severely impacting the expandability of the multitude of the cores of a processor.

Second, there is unavoidable conflict between private caches and shared caches. Private caches having multiple copies of same data leads to decreased efficiency of cache usage. Although shared caches can reduce data redundancy and increase cache space usage, with an increasing number of cores and a LLC's inter-connection with every CPU core, hardware related latency inherent to the LLC design will increase, causing extended cache latency.

Lastly, the need of an index based data consistency protocol to analyze the private caches of all the CPU cores leads to constrained data read and data write operation. For example, every data read operation has to visit the LLC and cache index in order to assure that the presently accessed data is consistent with the copies in the private caches of other CPU cores, resulting in decreased data accessibility.

SUMMARY

The present disclosure provides for a multi-core processor that supports cache consistency, solving the problems of that, with the current technology, the cache index of a multi-core processor consumes a large amount of cache space, affects data accessibility, and causes extended latency when accessing a shared cache. The present disclosure further provides for a method and apparatus for data reading, a method and apparatus for data writing, a method and apparatus for memory allocation, as well as a system, all by use of a multi-core processor.

According to an exemplary embodiment of the present disclosure, a multi-core processor supporting cache consistency includes a plurality of cores, the plurality of cores correspond to respective local caches. A local cache of a core of the plurality of cores is responsible for caching data in a different range of addresses in a memory space; and a core of the plurality of cores accesses data in a local cache of another core of the plurality of cores via an interconnect bus.

With an alternative embodiment, the plurality of cores of the multi-core processor access in the memory space memory sections at ranges of addresses corresponding to respective local caches of the cores. With another alternative embodiment, the multi-core processor includes a memory controller operably coupled to the plurality of cores for providing data from the memory space to the plurality of cores. With still another alternative embodiment, a local cache of a core of the plurality of cores of the multi-core processor includes a level 1 (L1) cache and a level 2 (L2) cache.

According to another exemplary embodiment of the present disclosure, a method of data reading by use of an above described multi-core processor includes the step of a core of the multi-core processor, which is to execute a data read operation, determining whether the core is responsible for caching the data based upon a memory address of data to be read. The method also includes the step of, in response to a determination that the core is responsible for caching the data, reading the data from a local cache of the core; otherwise, sending a data read request to a remote core of the multi-core processor responsible for caching the data and receiving data returned by the remote core.

With an alternative embodiment, the above described step of determining whether the core is responsible for caching the data based upon the memory address of data to be read includes computing, based upon the memory address of the data and according to a pre-determined policy for dividing the memory space into corresponding addresses for caching, a labeling number of a core responsible for caching the data. The step further includes determining that the core is responsible for caching the data if the computed labeling number is the same as a labeling number of the core.

With another alternative embodiment, the above described pre-determined policy for dividing the memory space into corresponding addresses for caching is for a core of the plurality of cores to be responsible for caching data in the memory space in an address range of from MEM/N*n to MEM/N*(n+1)−1, where MEM is the capacity of the memory space, N is a total number of the plurality of cores, n is a labeling number of a core of the plurality of cores, n having a value ranging from 0 to N−1.

With still another alternative embodiment, the above described labeling number of a core responsible for caching the data can be computed with the formula:

Core No.=(*A*\**N*/MEM)mod *N*, where Core No. denotes the labeling number of a core, and A is the memory address of the data.

With still yet another alternative embodiment, the above described step of reading the data from the local cache of the core includes determining whether the data is cached in the local cache of the core based upon the memory address of the data. The step further includes, in response to a determination that the data is cached in the local cache of the core, reading the data from the local cache of the core; otherwise, accessing the memory space to read the data and load a memory block containing the data into the local cache of the core.

With another alternative embodiment, the above described step of sending a data read request to a remote core of the multi-core processor responsible for caching the data and receiving data returned by the remote core includes sending a data request to a remote core responsible for caching the data, the request including the memory address of the data and a labeling number of the core sending the data request. The step also includes the remote core reading the data from a local cache of the remote core and the remote core returning the data to the core sending the data request.

With yet another alternative embodiment, the above described step of the remote core reading the data from its local cache includes the remote core determining whether the data is cached in the local cache of the remote core based upon the memory address of the data. The step also includes, in response to a determination that the data is cached in the local cache of the remote core, reading the data from the local cache of the remote core; otherwise, based upon the memory address of the data, accessing the memory space to read the data and load a memory block containing the data into the local cache of the remote core.

According to another exemplary embodiment of the present disclosure, an apparatus for data reading by use of an above described multi-core processer includes a data read operation determination module configured for a core of the multi-core processor, which is to execute a data read operation, to determine whether the core is responsible for caching the data based upon a memory address of data to be read. The apparatus further includes a local cache reading module configured for, in response to a determination that the core is responsible for caching the data, reading the data from a local cache of the core. The apparatus also includes a remote cache reading module configured for, in response to a determination that the core is not responsible for caching the data, sending a data read request to a remote core of the multi-core processor responsible for caching the data and receiving data returned by the remote core.

With an alternative embodiment, the above described data read operation determination module includes a read labeling number computation sub-module configure for computing, based upon the memory address of the data and according to a pre-determined policy for dividing the memory space into corresponding addresses for caching, a labeling number of a core responsible for caching the data. The data read operation determination module further includes a labeling number determination sub-module configured for determining that the core is responsible for caching the data if the computed labeling number is the same as a labeling number of the core.

With another alternative embodiment, the above described pre-determined policy of the read labeling number computation sub-module is for a core of the plurality of cores to be responsible for caching data in the memory space in an address range of from MEM/N*n to MEM/N*(n+1)−1, where MEM is the capacity of the memory space, N is a total number of the plurality of cores, n is a labeling number of a core of the plurality of cores, n having a value ranging from 0 to N−1.

With still another alternative embodiment, the above described read labeling number computation sub-module computes a labeling number of a core responsible for caching the data with the formula:

Core No.=(*A*\**N*/MEM)mod *N*, where Core No. denotes the labeling number of a core, and A is the memory address of the data.

With yet still another alternative embodiment, the above described local cache reading module includes a local cache determination sub-module configured for determining, based upon the memory address of the data, whether the data is cached in the local cache of the core. The local ache reading module further includes a cache read execution sub-module configured for, in response to a determination that the data is cached in the local cache of the core, reading the data from the local cache of the core; and a memory read sub-module configured for, in response to a determination that the data is not cached in the local cache of the core, base upon the memory address of the data, accessing the memory space to read the data and load a memory block containing the data into the local cache of the core.

With another alternative embodiment, the above described remote cache reading module includes a request sending sub-module configured for sending a data request to a remote core responsible for caching the data, the request comprising the memory address of the data and a labeling number of the core sending the data request. The remote cache reading module further includes a remote read sub-module configured for the remote core to read the data from a local cache of the remote core; and a data returning sub-module configured for the remote core to return the data to the core sending the data request.

With yet another alternative embodiment, the above described remote read sub-module includes a remote cache determination sub-module configured for the remote core to determine, based upon the memory address of the data, whether the data is cached in the local cache of the remote core. The remote read sub-module further includes a remote cache read execution sub-module configured for, in response to a determination that the data is cached in the local cache of the remote core, reading the data from the local cache of the remote core, and a remote memory read sub-module configured for, in response to a determination that the data is not cached in the local cache of the remote core, based upon the memory address of the data, accessing the memory space to read the data and load a memory block containing the data into the local cache of the remote core.

According to still another exemplary embodiment of the present disclosure, a method of data writing by use of an above described multi-core processor includes the step of a core of the multi-core processor, which is to execute a data write operation, determining whether the core is responsible for caching the data based upon a memory address of the data to be written. The method also includes the step of, in response to a determination that the core is responsible for caching the data, writing the data to the local cache of the core; otherwise, sending a data write request to a remote core of the multi-core processor responsible for caching the data, the remote core writing the data to a local cache of the remote core, where the data write request comprises the memory address and content of the data to be written of the data write operation.

With an alternative embodiment, the above described step of determining whether the core is responsible for caching the data includes computing, based upon the memory address of the data and according to a pre-determined policy for dividing the memory space into corresponding addresses for caching, a labeling number of a core responsible for caching the data. The step also includes determining that the core is responsible for caching the data if the computed labeling number is the same as a labeling number of the core.

With another alternative embodiment, the method of data writing further includes the steps of, when writing the data to the local cache, the core, which is to execute the data write operation or the remote core, setting a dirty mark for a cache line containing the data; and when the marked cache line is replaced out of the local cache, writing data of the cache line into corresponding addresses in the memory space.

According to yet another exemplary embodiment of the present disclosure, an apparatus for data writing by use of an above described multi-core processor includes a data write operation determination module configured for a core of the multi-core processor to execute a data write operation determining whether the core is responsible for caching the data based upon a memory address of the data to be written. The apparatus further includes a local cache writing module configured for, in response to a determination that the core is responsible for caching the data, writing the data to the local cache of the core. The apparatus also includes a remote cache writing module configured for, in response to a determination that the core is not responsible for caching the data, sending a data write request to a remote core of the multi-core processor responsible for caching the data. The remote core writes the data to a local cache of the remote core, where the data write request comprises the memory address and content of the data to be written of the data write operation.

With an alternative embodiment, the above described data write operation determination module includes a write labeling number computation sub-module configured for computing, based upon the memory address of the data and according to a pre-determined policy for dividing the memory space into corresponding addresses for caching, a labeling number of a core responsible for caching the data. The data write operation determination module also includes a labeling number determination sub-module configured for determining that the core is responsible for caching the data if the computed labeling number is the same as a labeling number of the core.

With another alternative embodiment, both the above described local cache writing module and the above described remote cache writing module include a mark setting sub-module configured for setting a dirty mark for a cache line containing the data when writing the data to the local cache; correspondingly, the apparatus also includes a memory synchronizing module configured for writing data of the cache line into corresponding addresses in the memory space when the marked cache line is replaced out of the local cache.

According to still yet another exemplary embodiment of the present disclosure, a method of memory allocation by use of an above described multi-core processor includes the step of receiving a memory allocation request from a core of the multi-core processor. The method also includes the step of, based upon a pre-determined policy for dividing the memory space into addresses for caching, determining an address range in the memory space from which the core is responsible for caching the data; as well as the step of, based upon an amount of memory units to be allocated in the memory allocation request, allocating the amount of memory units to the core from the memory space corresponding to the address range.

According to another exemplary embodiment of the present disclosure, an apparatus for memory allocation by use of an above described multi-core processor includes a request receiving module configured for receiving a memory allocation request from a core of the multi-core processor. The apparatus also includes an address range determination module configure for, based upon a pre-determined policy for dividing the memory space into addresses for caching, determining an address range in the memory space from which the core is responsible for caching the data. The apparatus further includes a memory allocation execution module configured for, based upon an amount of memory units to be allocated in the memory allocation request, allocating the amount of memory units to the core from the memory space corresponding to the address range.

According to still another exemplary embodiment of the present disclosure, a system includes an above described multi-core processor, a memory controller coupled to a plurality of cores of the multi-core processor for providing data from the memory space to the plurality of cores; and a memory space coupled to the memory controller for storing data to be accessed by the plurality of cores.

With an alternative embodiment, the plurality of cores of the above described system access in the memory space memory sections at ranges of addresses corresponding to local caches of the cores.

According to still yet another embodiment of the present disclosure, a multi-core processor includes a plurality of cores, the plurality of cores divided into at least two core groups; and a plurality of local caches corresponding to the core groups. A local cache of a core group is responsible for caching data in a different range of addresses in a memory space and a core group accesses data in a local cache of another core group via an interconnect bus.

In comparison to the present technologies, the primary differences and effects provided by the embodiments in accordance with the present disclosure are the following. First, the multi-core processor supporting cache consistency and the method of data reading and writing by use thereof, provides for eliminating the cache index and shared cache from the conventional multi-core processor system. By use of a pre-determined policy to map the memory space to CPU cores, making different core responsible for caching data in the memory space at different corresponding ranges of addresses will make sure that there is no multiple copies of data in caches. Thus, absent an cache index, cache consistency can still be realized, at the same time preserving the usage of cache space and enhancing data accessibility. Further, because each core can access data in the local cache of other cores via a communication interconnect bus, the private caches can be shared amongst the cores, not only solving the conflict between private caches and shared caches, but also maximizing the low data latency inherent to the private caches, enhancing the overall system functionality. Furthermore, due to the elimination of the LLC, the interconnect architecture can be simplified, thereby preserving the usage of energy and chip surface areas, as well as speeding up cache access.

The details of one or more embodiments of the disclosure are set forth in the accompanying drawings and the description below. Other features, objects, and advantages of the disclosure will be apparent from the description and drawings, and from the claims.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

In accordance with embodiments of the present disclosure, a multi-core processor, a method and apparatus for data reading by use of a multi-core processor, a method and apparatus for data writing by use of a multi-core processor, a method and apparatus for memory allocation by use of a multi-core processor, and a system of a multi-core processor are illustrated. Embodiments of the present disclosure are discussed herein with reference to FIGS. 2-11. However, those skilled in the art will readily appreciate that the detailed description given herein with respect to these figures is for explanatory purposes as the disclosure extends beyond these limited embodiments.

Figure 1:
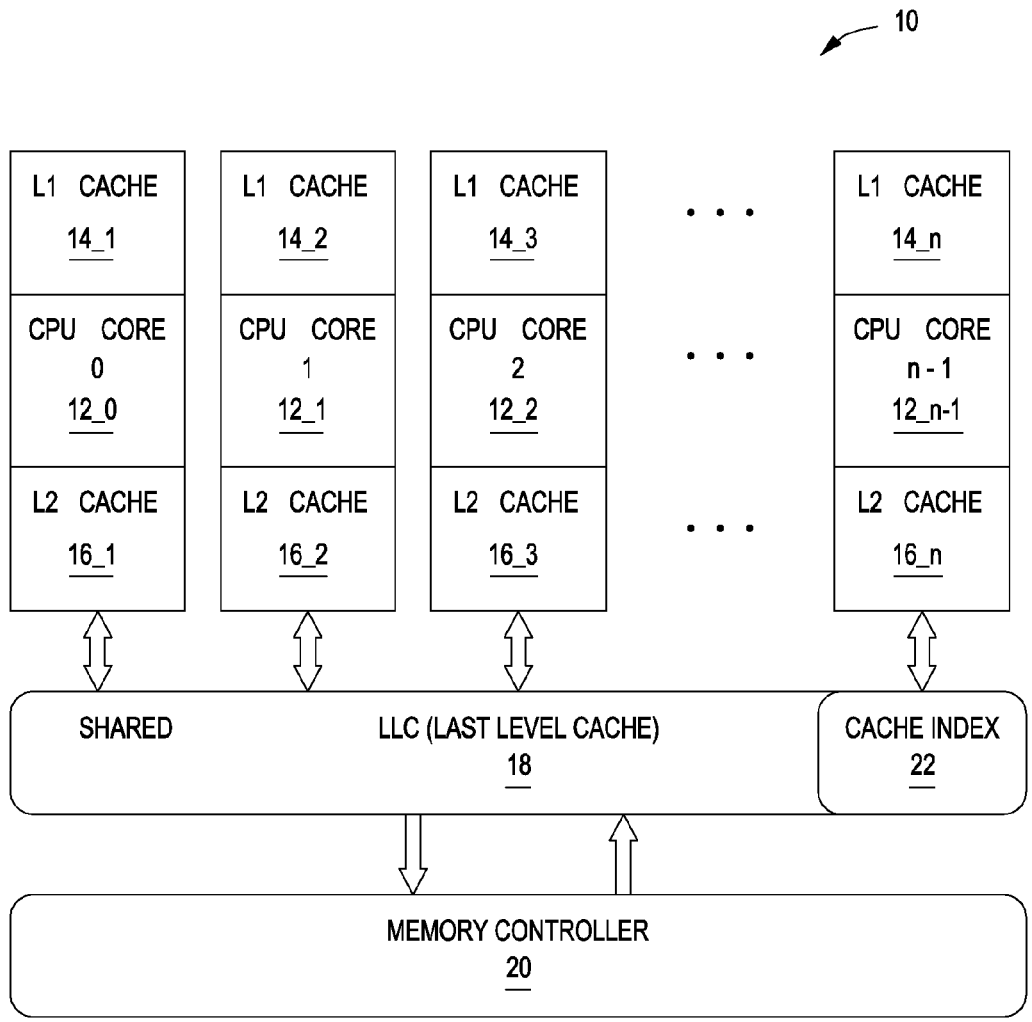
FIG. 1 is a block diagram of a system of a prior art multi-core processor.
Figure 2:
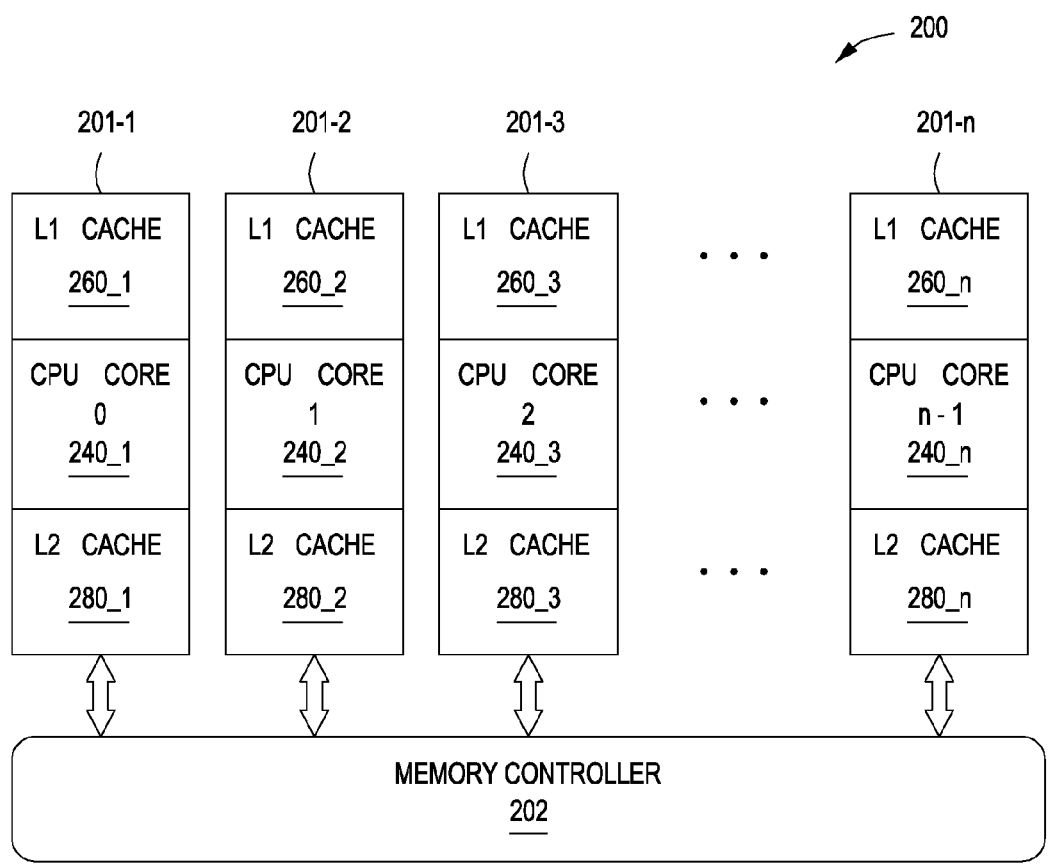
FIG. 2 is a block diagram of an exemplary system of a multi-core processor supporting cache consistency, in accordance with an embodiment of the present disclosure.

Referring to FIG. 2, a block diagram of an exemplary system of a multi-core processor supporting cache consistency in accordance with an embodiment of the present disclosure is shown. The cache consistency supporting multi-core processor 200 includes a plurality of cores 201-1, 201-2, 201-3, . . . , 201-n, where n is a natural number. Each of the plurality of cores has a two leveled local cache that includes a respective L1 cache 260_1, 260_2, 260_3, . . . , 260_n and a respective L2 cache 280_1, 280_2, 280_3, . . . , 280_n in addition to a respective CPU 240_1, 240_2, 240_3, . . . , 240_n. The multi-core processor 200 can also include a memory controller 202 for the plurality of cores to access data in a memory space. A local cache of a different core of the plurality of cores is responsible for caching data in a different range of addresses in the memory space. A core of the plurality of cores accesses data in a local cache of another core of the plurality of cores via a interconnect bus or a main bus (not shown).

Conventional multi-core processors dedicate a certain amount of cache space to maintain a cache index and access such cache index frequently for the purpose of maintaining data consistency in the caches. One of the reasons behind data inconsistency amongst the caches lies in the fact that different processing cores having privates caches (i.e., the local caches of the cores) leads to the possibility of multiple copies of data. In order to solve this technical problem, the present disclosure abrogates the use of a cache index. Instead, with a local cache of a different core being responsible for caching data residing at different address ranges in the memory space, data in the memory space can only be cached in one local cache of one core such that cache consistency is nevertheless maintained without a cache index. For the simplicity of illustration, the relationship between the cores and their corresponding caching address ranges in the memory space is referred to herein as a unitary memory mapping mechanism.

Various approaches can be implemented to divide memory addresses into address ranges for caching. In order to increase the efficiency of accessing data in the memory and to avoid excessive memory fragmentation resulted from the memory allocation and management by an operating system, usually the memory addresses are divided into multiple continuous sections according to the number of the processing cores. A core can be pre-designated to be responsible for caching data in one of the sections in the memory space, different core responsible for caching data of different memory sections.

For example, with a multi-core processor having 256 cores (N=256), its memory capacity being 1TByte (MEM=1 TB), and the memory addresses presented in a hexadecimal format of from 0x00 0000 0000 through 0xFF FFFF FFFF, the memory addresses are divided according to N, the number of the cores, i.e., divided into 256 continuous memory segments such that each memory segment having a size of 1TByte/256=4 GByte. Each core of the multi-core processor is responsible for caching data in the address range of from MEM/N*n to MEM/N*(n+1)−1, where N is the number of the cores, and n is a natural number. The following illustrates a mapping relationship between the cores and the respective corresponding ranges of addresses in the memory for caching:

| Core No. 0: | 0x00 0000 0000 – 0x00 FFFF FFFF |
| Core No. 1: | 0x00 0000 0000 – 0x01 FFFF FFFF |
| Core No. 2: | 0x00 0000 0000 – 0x02 FFFF FFFF |
| ... | |
| Core No. 255: | 0x00 0000 0000 – 0xFF FFFF FFFF |

With the above described division of the memory space, for example, the core No. 0's local cache, i.e., L1 cache and L2cache, will be responsible for caching data of memory addresses ranging from 0x00 0000 0000 through 0x00 FFFF FFFF. In other words, each core is responsible for caching data residing in different ranges of addresses in the memory, consequently there are no multiple copies of data in the caches. Therefore, absent a cache index, cache consistency is nevertheless assured, eliminating the cache space occupied by the cache index. On the other hand, due to the fact that certain data are cached only by a certain cache, a core can access data directly without consulting the cache index, thus enhancing performance when accessing data.

Based upon the above described unitary memory mapping mechanism, a core of the multi-core processor utilizes an inter-connected main bus to access data in the local caches of other cores of the multi-core processor. In other words, each core not only can access data in its respective local cache, it can also access data in other cores' local caches via a communication main bus that interconnects the plurality of cores, realizing the sharing of local caches amongst the plurality of cores of the multi-core processor.

For example, when the data that the core No. 0 needs to read resides in the memory sections for the core No. 1 to cache, the core No. 0 will send a data read request via its cache controller to the cache controller of the core No. 1. The cache controller of the core No. 1 then retrieves the data from its local cache and returns the data back to the core No. 0. In implementations, if the core No. 1 incurs a cache miss in its local L1 cache and L1 cache, the core No. 1 will read the data from the memory space.

With the above described embodiment of the present disclosure, each core of the multi-core processor shares its respective local caches amongst other cores of the multi-core processor, enabling the sharing of local caches. Not only it solves the problem with the current techniques with regard to conflicts between private caches and shared caches, but also enhances the overall system functionality by benefitting from the low data latency inherent to private caches.

Further, due to the realization of sharing local caches, a LLC can be removed from the multi-core processor system such that inter-connecting architecture of the system can be simplified. For example, with a system of 8 CPUs, the inter-connection or inter-communication between the cores and a shared cache can consume about one CPU's processing capacity and about half of the total CPUs' (i.e., 4 CPUs) chip surface areas, as well as contributing to about half the amount of the LLC latency due to the wire latency of the inter-communication. Thus, the removal of the LLC can greatly simplify the inter-connect or inter-communication architecture, preserving the usage of both energy and chip surface areas, and increasing the speed to access caches.

By use of the above described hardware system, both cache consistency and sharing of private caches can be realized. Taking into account that it is faster for a core to access its local cache than other cores', the present disclosure provides for a multi-core processor by use of the above described system, with an alternative embodiment related to a core's usage of memory, each core accessing the memory sections at ranges of addresses corresponding to a local cache of the core. Here, a core's usage of memory refers to requests by the core to an operating system to allocate memory to the core, to read from the write to the memory allocated, and to manage and to return the released memory allocation to the operating system.

In particular, when a core sends a memory allocation request to the operating system, the operating system utilizes a system similar to NUMA (Non-Uniform Memory Architecture) or the like, to allocate memory sections to the core. Under the NUMA architecture, multiple processors couple with a memory block via a memory bus to form a node. The entire system is divided into a multitude of such nodes, a memory at a node being referred to as local memory, while memory at other nodes being referred to with respect of the present node as foreign memory. When allocating memory for a program executing on a processor, the operating system usually allocates from such processor's local memory, not from its foreign memory such that to enhance data accessibility.

In accordance with embodiments of the present disclosure, an operating system executing on a multi-core processor can utilize a similar memory allocating mechanism, designating a core and the memory sections for which the core is responsible to cache data, as a virtual node. When a core sends to the operating system a memory allocation request, the operating system allocates from the virtual node's local memory (i.e., the memory sections for which the core is responsible for caching data). By use of the above described unitary memory mapping mechanism, data residing in the memory sections will be loaded into the local cache of the core, the core can thereby directly access its local cache to accomplish the requested data reading and data writing, avoiding the latency caused by accessing the local cache of the other core and enhancing the overall functionality of the system.

It is necessary to point out that, with the above described embodiment of the present disclosure, a core of the multi-core processor includes a two leveled local cache, and a memory controller. In some alternative embodiments of the present disclosure, a core can include a one leveled local cache, or a multiple leveled local cache, or not having a memory controller internal to the multi-core processor. Further, the mapping relationship between the caches and the memory sections in the memory space can be implemented in other relationships different than the one described above. Furthermore, an operating system can also utilize other mechanisms to allocate memories. All of those are mere variations that implement the embodiments of the present disclosure. As long as the implementation provides for different cores being responsible for caching in its local cache data residing in different address ranges in the memory space, as well as a core being able to access data in other cores' local caches via a main communication bus, the benefits of realizing cache consistency and the sharing of local caches amongst the cores, absent a LLC and cache index, can be achieved.

Figure 3:
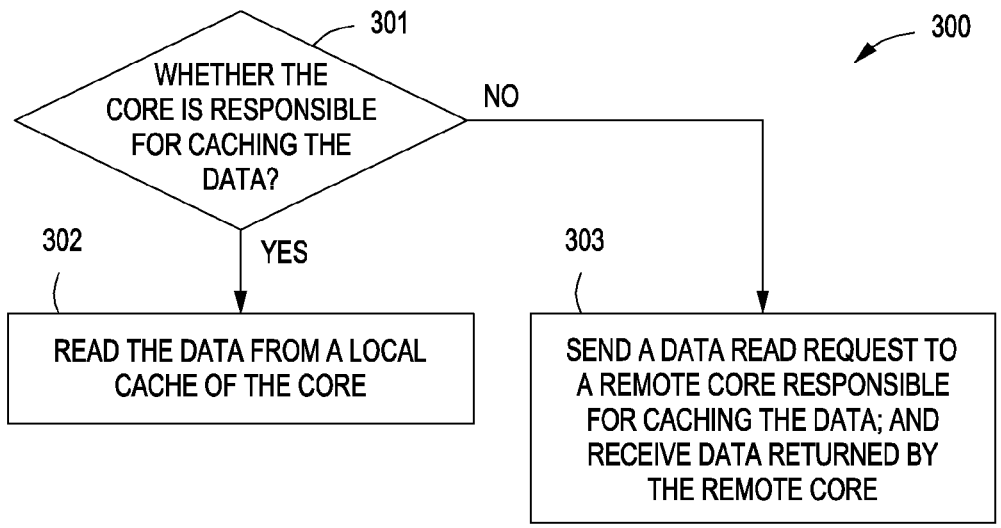
FIG. 3 is a flow chart of a method of data reading by use of a multi-core processor in accordance with an embodiment of the present disclosure.

Referring now to FIG. 3, a flow chart of an exemplary method of data reading by use of a multi-core processor in accordance with an embodiment of the present disclosure is shown. The method 300 starts in decision block 301, where, a core, which is to perform a data read operation, based upon a memory address of data to be read, determines whether the core is responsible for caching the data. If the core is responsible for caching the data, then the method 300 follows the YES branch and proceeds to step 302; otherwise, the method 300 follows the NO branch and proceeds to step 303.

In implementations, the process of data reading by a core can be performed by a cache controller. With the current technology, a cache controller will first search for the data in a local level one (L1) cache. If there is a cache miss, the cache controller continues to search for the data in the next level cache of the local caches. If all the local caches return a miss, the cache controller will send a LOAD command or request to the main bus to read the data from the memory through the memory controller, and to return the data read to the requesting core.

In accordance with the embodiments of the present disclosure, by use of the unitary memory mapping mechanism, the cache controller will first determine whether the core is responsible for caching the data requested after the core sends the data read request, then proceeds to the corresponding data read operations.

Figure 4:
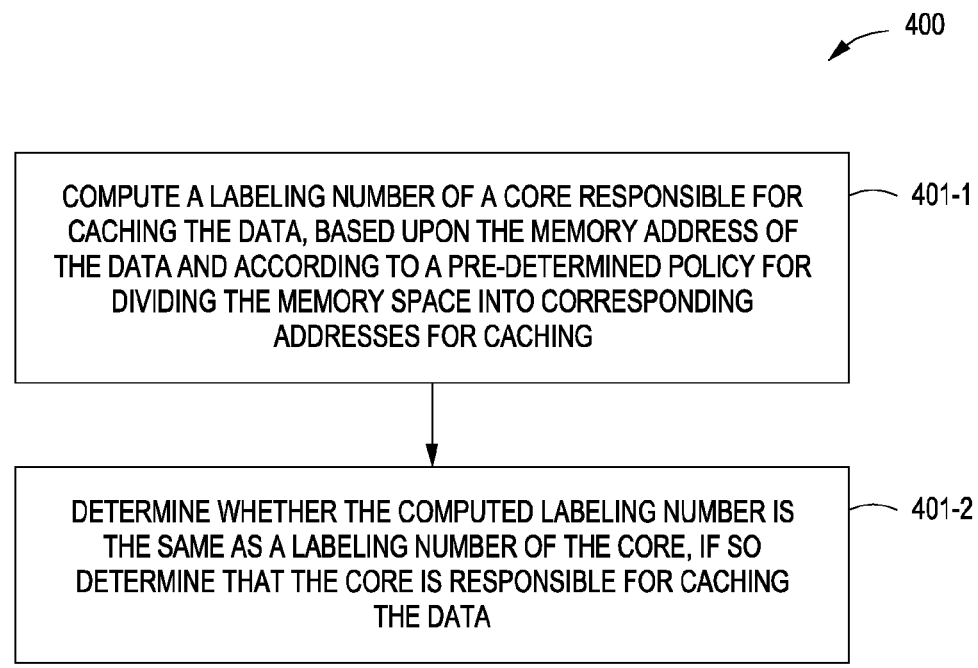
FIG. 4 is a flow chart of a method of determining whether a local cache is responsible for caching data, in accordance with an embodiment of the present disclosure.

Referring to FIG. 4, a flow chart of an exemplary method of determining whether a core is responsible for caching the data requested (an exemplary implementation of decision block 301) is shown. The method 400 starts with step 401-1 and concludes with step 401-2. In step 401-1, a labeling number of a core responsible for caching the data is computed, based upon the memory address of the data to be read and according to a pre-determined policy for dividing the memory space into corresponding addresses for caching. Such a policy for dividing the memory space into addresses for caching can be configured based upon circumstances. For example, in an exemplary embodiment, a straightforward and easy policy to divide the memory space can be implemented as to divide the memory addresses into continuous segments of a same size base on the number of the cores of the multi-core processor, and to establish a mapping relationship between the memory segments and the cores of the multi-core processor.

In particular, with the above described exemplary policy, each core is responsible for caching data in the memory at the addresses MEM/N*n to MEM/N*(n+1)−1, where MEM is the capacity of the memory, N is the number of the cores of the multi-core processor, n is the labeling number of a core, n being a natural number with a value ranging from 0 to N−1. The mapping relationship between the memory address ranges and the cores is as illustrated in the above description for the first embodiment.

Based on the above described policy of memory division, the labeling number of a core responsible for caching data can be computed with the formula:

$$\text{Core No.}=(A*N/\text{MEM})\bmod(N),$$

where Core No. denotes a labeling number of a core, A is the memory address of the data to be read.

For example, with a multi-core processor in the first embodiment of the present disclosure having 256 cores (N=256), memory capacity of 1 TByte (MEM=1 TB), memory addresses presented in a hexadecimal format of from 0x00 0000 0000 through 0xFF FFFF FFFF, by use of the above described dividing policy, the addresses can be divided into 256 continuous memory sections, each sections having a size of 1 Tbyte/256=4 GByte. If the address of the data to be read is at the address of 0x08 0000 A000 (hex), by use of the above described formula, the labeling number for a core is 8, i.e., the core No. 8 is responsible for caching the data to be read.

Referring back to FIG. 4, in step 401-2, it is determined whether the computed labeling number for the core is the same as the labeling number for the instant core. If so, the instant core is determined to be responsible for caching the requested data, and the method 400 proceeds to step 302 (following the YES branch out of decision block 301). Otherwise, another core of the multi-core processor is responsible for caching the requested data, the method 400 proceeds to step 303 (following the NO branch out of decision block 301).

Referring back to FIG. 3, if the method 300 proceeds to step 302, it is determined that the data to be read is cached by the requesting core' local cache. According to the theory of program locality and predictability mechanisms utilized by the hardware of a processor, the data to be read usually is a cache hit from the local cache of the requesting core. If it is a cache miss, the data can be read from the memory using the memory address of the data, and the memory block containing the data can be loaded into the local cache of the requesting core, increasing subsequent data accessibility. In implementations, the cache controller of the requesting core can utilize an address mapping mechanism to convert memory addresses into cache addresses, and determining whether the data is a cache hit in its own local cache.

For example, the minimal unit of data transfer between memory and caches is referred to as a cache line. A memory address can include fields of tag, set index and offset. The logic structure of a cache includes multiple groups, each group having multiple cache lines, each cache line having tags and multiple storage units. Based upon the value of a memory address' set index, it can be determined that which group in the cache the data belongs to. By comparing the values of the tags of the cache lines and the tag of the memory address, if a cache line is found to have a same tag value as the memory address, then the memory block containing the data has already been loaded into the cache. Consequently, there is a cache hit, and the data will be read from the cache line utilizing the value of the offset field in the memory address of the data.

If there is a cache miss in the local cache, then a LOAD request is sent to the main bus, the memory controller will read the requested data from the memory based on the memory address of the data, and return the data read to the cache controller, which in turn provides the data read to the requesting core.

Because the data to read is under the requesting core's responsibility to cache, if the data is obtained from the memory by use of the above described process, the data will be loaded to the cache of the requesting core. In implementations, due to the fact that the minimal unit of data transfer between memory and caches is a cache line, based on the size of the cache line, data of a memory block of a corresponding size of that of the cache line and containing the requested data can be loaded into the local caches of the requesting core.

Referring to FIG. 3, in step 303, a data read request is sent to a remote core (another core of the multi-core processor) which is responsible for caching the requested data, and the data read is received from the remote core that returns the data.

When the method 300 proceeds to step 303, it means that the data to be read is cached by a core other than the instant requesting core. In order to distinguish from the requesting core, a core responsible for caching such data is referenced herein as a remote core. Therefore, the requesting core does not search for the data in its local caches, instead, after step 301, it sends a data read request to the remote core having a labeling number matching the computed core labeling number, and receives from such remote core the returned data.

In implementations, when the cache controller of the requesting core sends the data read request to the cache controller of the remote core, it also sends the memory address of the requested data, as well as the core labeling number of the requesting core. The cache controller of the remote core utilizes a step similar to step 302 to search for the data in its local cache. If there is a cache hit, returns the retrieved data directly back to the cache controller of the requesting core; otherwise, based on the memory address of the data to read the data from the memory and sends the data read back to the requesting core.

Because the requested data is under the remote core's responsibility to cache, if the data is obtained by the remote core from the memory as described above, then the cache controller of the remote core loads the data into its local cache after reading it from the memory. However, the requesting core will not load the data into its local cache after receiving it from the remote core. Next time when the requesting needs to access the same data, it still sends the read request to the remote core. With this method, it can be assured that the data are only cached in the local caches of the remote core, eliminating the possibility of the existence of multiple copies of the data in the multi-core processor, thereby assuring the cache consistency from the perspective of the data read operation.

Figure 5:
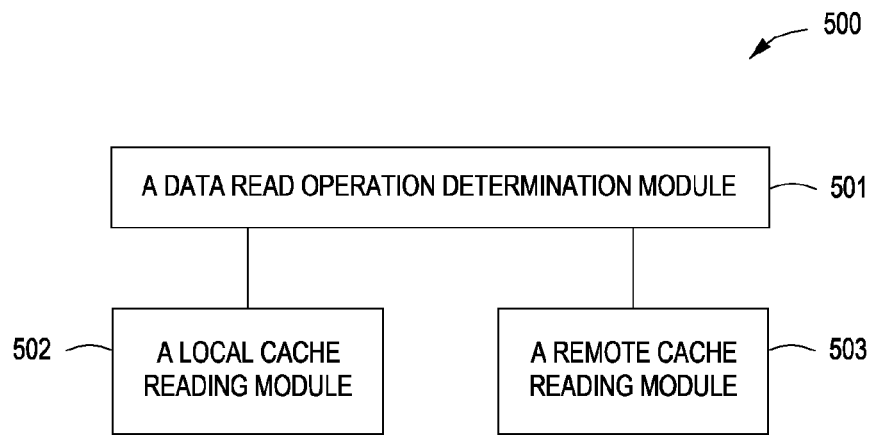
FIG. 5 is a block diagram of an exemplary apparatus for data reading by use of a multi-core processor in accordance with an embodiment of the present disclosure.

Referring now to FIG. 5, a block diagram of an exemplary apparatus for data reading by use of a multi-core processor corresponding to the method described above and in accordance to an embodiment of the present disclosure is shown. As the embodiment of the apparatus for data reading is substantially similar to the embodiment of the method of data reading described above, the apparatus is illustrated herein with relative simplicity, with pertinent details described in the method embodiment.

The apparatus 500 for data reading includes a data read operation determination module 501, configured for the core, which is to execute a data read operation, to determine whether the instant core is responsible for caching the data, based upon the memory address of data to be read. The apparatus 500 further includes a local cache reading module 502, configured for, in response to a determination that the core is responsible for caching the data, reading the data from a local cache of the core. The apparatus 500 also includes a remote cache reading module 503, configured for, in response to a determination that the core is not responsible for caching the data, sending a data read request to a remote core of the multi-core processor responsible for caching the data and receiving data returned by the remote core.

With some alternative embodiments, the data read operation determination 501 includes a read labeling number computation sub-module and a labeling number determination sub-module. The read labeling number computation sub-module is configured for computing, based upon the memory address of the data and according to a pre-determined policy for dividing the memory space into corresponding addresses for caching, a labeling number of a core responsible for caching the data. The labeling number determination sub-module is configured for determining whether the computed labeling number is the same as a labeling number of the core, and determining that the core is responsible for caching the data if the two labeling numbers are the same.

With some other alternative embodiments, the pre-determined policy of the read labeling number computation sub-module is for a core of the plurality of cores to be responsible for caching data in the memory space in an address range of from MEM/N*n to MEM/N*(n+1)−1, where MEM is the capacity of the memory space, N is a total number of the plurality of cores, n is a labeling number of a core of the plurality of cores, n having a value ranging from 0 to N−1.

With still some other alternative embodiments, the read labeling number computation sub-module computes a labeling number of a core responsible for caching the data with the formula:

$$\text{Core No.}=(A*N/\text{MEM})\bmod(N),$$

where Core No. denotes a labeling number of a core, A is the memory address of the data to be read.

With still further alternative embodiments, the local cache reading module 502 includes a local cache determination sub-module, a cache read execution sub-module and a memory read sub-module. The local cache determination sub-module is configured for determining, based upon the memory address of the data, whether the data is cached in the local cache of the core. The cache read execution sub-module is configured for, in response to a determination that the data is cached in the local cache of the core, reading the data from the local cache of the core. And the memory read sub-module is configured for, in response to a determination that the data is not cached in the local cache of the core, base upon the memory address of the data, accessing the memory space to read the data and load a memory block containing the data into the local cache of the core.

With other alternative embodiments, the remote cache reading module 503 includes a request sending sub-module, a remote read sub-module and a data returning sub-module. The request sending sub-module is configured for sending a data request to a remote core responsible for caching the data, the request including the memory address of the data and a labeling number of the core sending the data request. The remote read sub-module is configured for the remote core to read the data from a local cache of the remote core. And the data returning sub-module is configured for the remote core to return the data to the core sending the data request.

With still other alternative embodiments, the remote read sub-module includes a remote cache determination sub-module, a remote cache read execution sub-module and a remote memory read sub-module. The remote cache determination sub-module is configured for the remote core to determine, based upon the memory address of the data, whether the data is cached in the local cache of the remote core. The remote cache read execution sub-module is configured for, in response to a determination that the data is cached in the local cache of the remote core, reading the data from the local cache of the remote core. And the remote memory read sub-module is configured for, in response to a determination that the data is not cached in the local cache of the remote core, based upon the memory address of the data, accessing the memory space to read the data and load a memory block containing the data into the local cache of the remote core.

Figure 6:
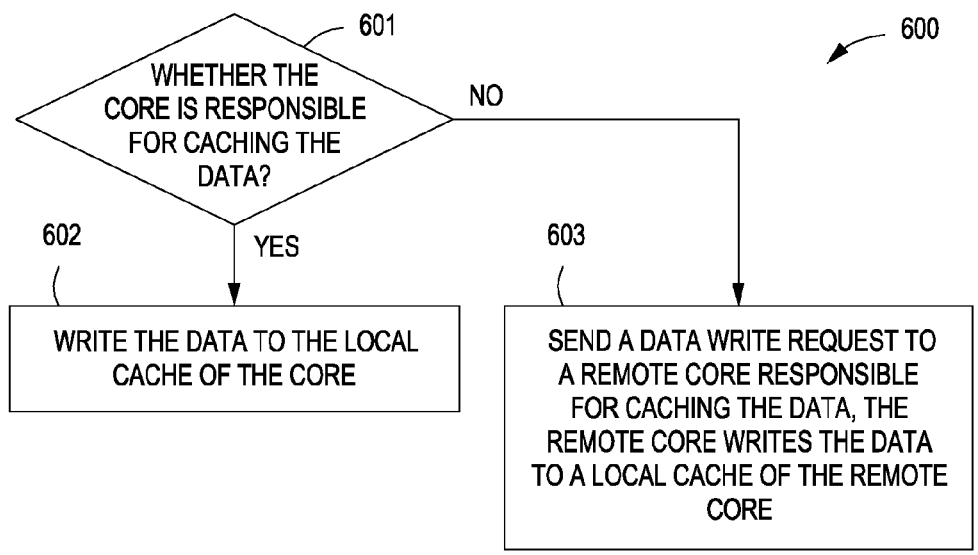
FIG. 6 is a flow chart of an exemplary method of data writing by use of a multi-core processor in accordance with a second embodiment of the present disclosure.

Referring to FIG. 6, a block diagram of an exemplary method of data writing by use of a multi-core processor in accordance to an embodiment of the present disclosure is shown. As the embodiment of the method of data writing shares certain similarity to the embodiment of the method of data reading described above, the method of data writing is illustrated herein with relative simplicity, with pertinent details described in the embodiments above.

The method 600 starts in decision block 601, where a core to execute a data write operation, based upon a memory address of the data to be written, determines whether the instant core is responsible for caching the data. If the core is responsible for caching the data, then the method 600 follows the YES branch and proceeds to step 602; otherwise, the method 600 follows the NO branch and proceeds to step 603.

In implementations, the core to execute a data write operation will, based upon the memory address of the data to be written and according to a pre-determined policy for dividing the memory space into corresponding addresses for caching, compute a labeling number of a core responsible for caching the data. Then, the core determines that the instant core is responsible for caching the data if the computed labeling number is the same as a labeling number of the core. Further details are as illustrated in the above described embodiments.

In step 602, the data is written to the local caches. If the method 600 proceeds to step 602, it is determined that the data to be written is for the requesting core to cache. Therefore, the requesting core will first search for the data in its local cache. If there is a cache hit, the data is written to the local cache directly. Otherwise, based on the memory address of the data to be written, the method 600 will load the memory block containing the data to be written into the local cache of the requesting core, and write the data into the local cache.

In implementations, the cache controller of the core to execute the data write request can utilize an address mapping mechanism to convert memory addresses into cache addresses, and determine whether the data is a cache hit in its own local cache. Again, pertinent details are as illustrated in step 302 of the above described second embodiment.

With a cache hit, the offset value of the memory address can be utilized to determine the data units of the instant cache line with the cache hit, and the data of the data write operation will be written to the determined data units. If there is a cache miss, a cache line can be allocated in the local cache corresponding to the memory block containing the data to be written, based on the memory address of the data to be written. Data of the corresponding memory block is loaded into the newly allocated cache line in the local cache, then, based on the offset value of the memory address of the data to written, write the data of the data write operation into the corresponding data units of the cache line.

In step 603, the method 600 sends a data write request to a remote core of the multi-core processor responsible for caching the data, and the remote core writes the data into the local cache of the remote core. When the method 600 proceeds to step 603, it means that the data to be written is cached by a core other than the instant requesting core, i.e., a remote core of the multi-core processor. Therefore, the requesting core does not operate the data write request in its local caches, instead, it sends a data write request to the remote core having a labeling number matching the core labeling number computed in step 601, and remote core writes the data to its own local caches accordingly.

In implementations, when the requesting core sends to the cache controller of a remote core the data write request, it sends the memory address of the data to be written, as well as the content and the length of the data to be written. The cache controller of the remote core utilizes a process similar to step 602 to search for the data in its local cache. If there is a cache hit, the remote core writes the data directly into the data units of the corresponding cache line with the hit; otherwise, based on the memory address of the data to be written, the remote core first loads the corresponding memory block into the local cache, then writes the data to be written into the local cache.

Through the execution of steps 602 or 603, data of a data write operation is written either into the local cache of the core requesting for the data write operation or into the local cache of a remote core. Therefore, the data write operation will be not performed in the local caches of two cores of the multi-core processor, thereby assuring cache data consistency from the perspective of data writing operations.

In implementations, if data is only written into a cache upon a data write operation without being written into its corresponding memory address, inconsistency between the two copies of data will occur. In order to assure memory data and cache data consistency, current techniques usually rely on a WRITE THROUGH approach or a WRITE BACK approach.

With a WRITE THROUGH approach, a core writing data directly to its local cache will at the same time write the data to the memory such that simultaneous update of memory data is guaranteed. With a WRITE BACK approach, a core writes data only directly to its local cache. Only when the data is again modified, the core writes the prior updated data into the memory, and then writes the new updated data into the local cache.

With current techniques, if the WRITE THROUGH approach is deployed, due to the relatively lower speed of accessing memory, the overall data writing speed of the processor will be decreased. If the WRITE BACK approach is deployed, even though the number of memory access can be reduced, with a multi-core processor, a cache index needs to be consulted and corresponding NULL operations need to be performed. For example, when a CPU writes data to its private cache, it first determines which cores' private caches have a copy of the data by consulting the cache index. In order to assure cache data consistency, it then notifies those private caches to set the cache line obtaining the data as NULL before executing the data write operation. When multiple cores take turns to write data to a certain memory block, corresponding cache lines in the cores' private caches will be set as NULL repeatedly, triggering a ping-pong phenomenon that results in decreased data accessibility.

In accordance with an embodiment of data write of the present disclosure, the method of data writing is by use of a multi-core processor system utilizing a unitary memory mapping mechanism. With such system, different cores local caches are responsible for caching data at different ranges of addresses in the memory. Under this circumstance, there is no need to utilize a cache index to track data residing in the private caches of different cores, nor to execute the above described NULL operations. Thus, with a WRITE BACK approach, the number of memory access will be reduced without any ping-pong effects, significantly enhancing data accessibility.

In particular, in step 602 or step 603 where the data write requesting core or the remote core writes the data to be written to a corresponding local cache, it does not write the data into a corresponding memory address. Instead, the cache line containing the data is marked with dirty parity information, indicating that there has been change to the data.

When a cache is filled, the cache controller will utilize a pre-determined approach to replace cache lines. If the cache line to be replaced bears a dirty parity mark, then the data in the cache line will be written into the corresponding memory addresses to assure consistency between cache data and memory data.

With the methods of data reading and data writing as described above, a requesting core first determines whether it is responsible for caching the data to be accessed. If so, it performs the data access operation within its local cache or its corresponding memory. Otherwise, it sends a data request to a remote core to perform the corresponding the data access request and to return the result of such data access request. By use of the above described methods of data reading and data writing, costs associated with accessing and maintaining a cache index can be eliminated, as well as the execution of repeated NULL operations, assuring cache data consistency, simplifying data access process and at the same time enhancing data accessibility.

Figure 7:
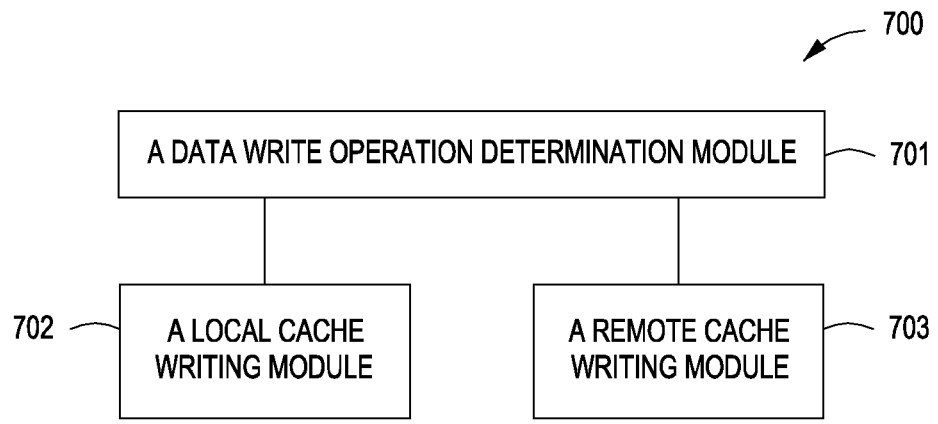
FIG. 7 is a block diagram of an exemplary apparatus for data writing by use of a multi-core processor in accordance with an embodiment of the present disclosure.

Referring to FIG. 7, a block diagram of an exemplary apparatus for data writing by use of a multi-core processor corresponding to the method described above and in accordance to an embodiment of the present disclosure is shown.

As the embodiment of the apparatus for data writing is substantially similar to the embodiment of the method of data writing described above, the apparatus is illustrated herein with relative simplicity, with pertinent details described in the method embodiment.

The apparatus 700 includes a data write operation determination module 701, a local cache writing module 702 and a remote cache writing module 703. The data write operation determination module 701 is configured for the a core of the multi-core processor that is to execute a data write operation to determine, based upon a memory address of the data to be written, whether the core is responsible for caching the data. The local cache writing module 702 is configured for, in response to a determination that the core is responsible for caching the data, writing the data to the local cache of the core. And the remote cache writing module 703 is configured for, in response to a determination that the core is not responsible for caching the data, sending a data write request to a remote core of the multi-core processor responsible for caching the data, the remote core writing the data to a local cache of the remote core. The data write request comprises the memory address and content of the data to be written of the data write operation.

With some alternative embodiments, the above described data write operation determination module 701 includes a write labeling number computation sub-module and a labeling number determination sub-module. The write labeling number computation sub-module is configured for computing, based upon the memory address of the data and according to a pre-determined policy for dividing the memory space into corresponding addresses for caching, a labeling number of a core responsible for caching the data. And the labeling number determination sub-module is configured for determining that the instant core is responsible for caching the data if the computed labeling number is the same as a labeling number of the core.

With some other alternative embodiments, both of the above described local cache writing module 702 and the remote cache writing module 703 can further include a mark setting sub-module. The mark setting sub-module is configured for setting a dirty parity mark for a cache line containing the data when writing the data to the local cache. Correspondingly, the apparatus can also include a memory synchronizing module. The memory synchronizing module is configured for writing data of the cache line into corresponding addresses in the memory space when the marked cache line is replaced out of the local cache.

Figure 8:
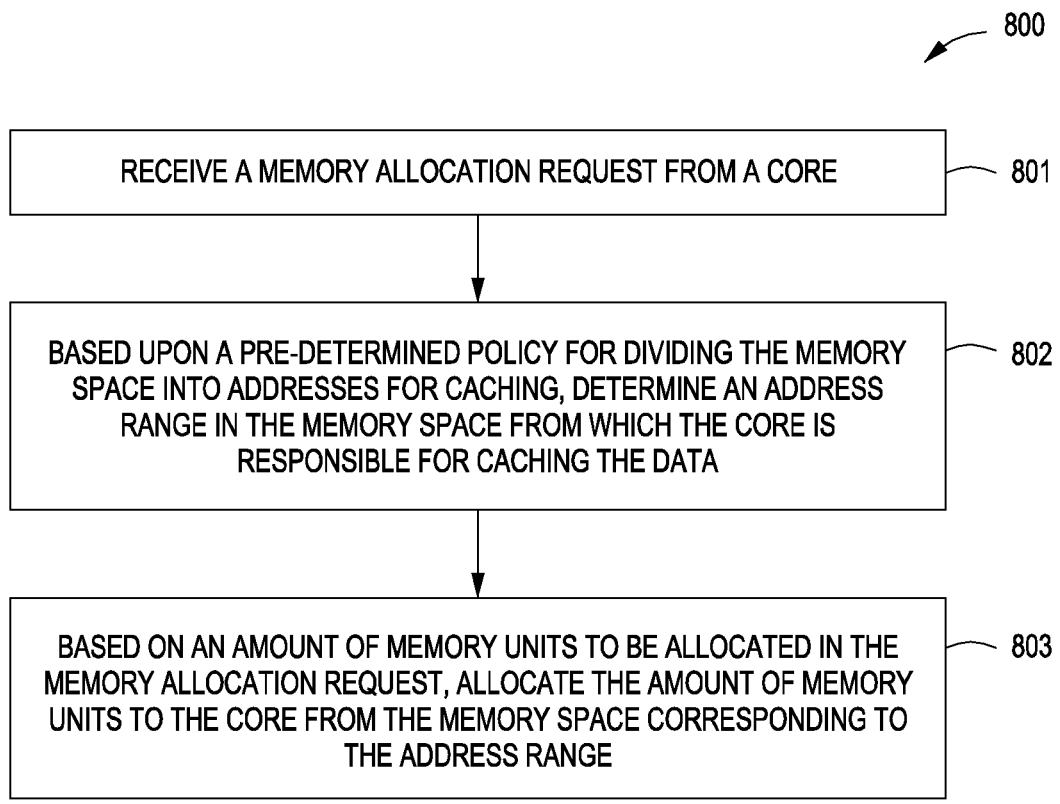
FIG. 8 is a flow chart of an exemplary method of memory allocation by use of a multi-core processor in accordance with an embodiment of the present disclosure.

Referring to FIG. 8, a flow chart of an exemplary method of memory allocation by use of a multi-core processor in accordance with embodiments of the present disclosure is shown. As the embodiment of the method of memory allocation shares certain similarity to the embodiment of the method of data reading described above, the method of memory allocation is illustrated herein with relative simplicity, with pertinent details described in the embodiments above.

The method 800 starts at step 801, where a memory allocation request is received from a core. For a multi-core processor, when a core needs to access the memory, for example, a program (e.g. a thread) executing on the instant core needs to allocate memories for a data structure, it will call a function to send to the operating system a request for the operating system to allocate memory space. The operating system will accordingly receive such a memory allocating request, which includes not only the amount of data units to be allocated in the memory space, but also an identification for the memory allocation requesting core, for example, a labeling number of the core. A data unit refers herein to the smallest unit in which data can be stored in the memory, usually also the smallest unit with which the operating system performs memory allocation. For example, such a data unit can be a 8 bit, i.e., a byte.

In step 802, based upon a pre-determined policy for dividing the memory space into addresses for caching, an address range in the memory space from which the core is responsible for caching the data is determined. While a core is responsible for caching data from different range of addresses in the memory space, the operating system running on the multi-core processor also allocates memory to a core of the multi-core processor according to such address range dividing policy.

In implementations, such a policy for dividing the memory space into ranges of addresses can be configured based upon circumstances. For example, in an exemplary embodiment, a policy to divide the memory space can be implemented as to divide the memory addresses into continuous segments of a same size base on the number of the cores of the multi-core processor, and to establish a mapping relationship between the memory segments and the cores of the multi-core processor. Pertinent details are as illustrated in the above described first embodiment.

In the instant step 802, based upon the identification of the core included in the request as well as the above described pre-determined division policy, an address range in the memory space for which the requesting core is responsible for caching data can be determined. For example, with the exemplary memory division policy of the first embodiment, if the core No. 1 sends to the operating system a request to allocate a memory segment of 128 bytes, it can be determined that the instant core is responsible for the memory space at addresses ranging from 0x01 0000 0000 through 0x01 FFFF FFFF.

In step 803, based upon an amount of memory units to be allocated in the memory allocation request, a corresponding amount of memory units is allocated to the core from the memory space corresponding to the address range. In this step, based on the amount of data units specified in the memory allocation request and in the memory address range determined in step 802, the operating system searches for a free memory block (a memory block that has not been allocated) that has sufficient capacity to satisfy the requested amount of data units. According to a certain policy, the operating system selects a memory block of a corresponding size, and returns the starting address of the selected memory block to the requesting core. In other words, upon the operating system allocating the selected memory block to the instant requesting core, the core can start accessing the allocated memory block for data reading, data writing and operations alike.

In accordance with the above describe embodiment, an operating system running on such a multi-core processor utilizes the above described method to allocate memory blocks to each core, the memory blocks all residing in the address ranges for which the cores are responsible to cache data respectively. When data of the memory blocks are to be loaded into a cache, it will be loaded into the local cache of the corresponding core. Consequently, a core's access of the memory usually can be accomplished via searching first in its local cache. For only a limited amount of shared data it needs to access the local caches of other cores. Due to the low cache latency and fast speed inherent to accessing a local cache, data accessibility is thereby enhanced.

Figure 9:
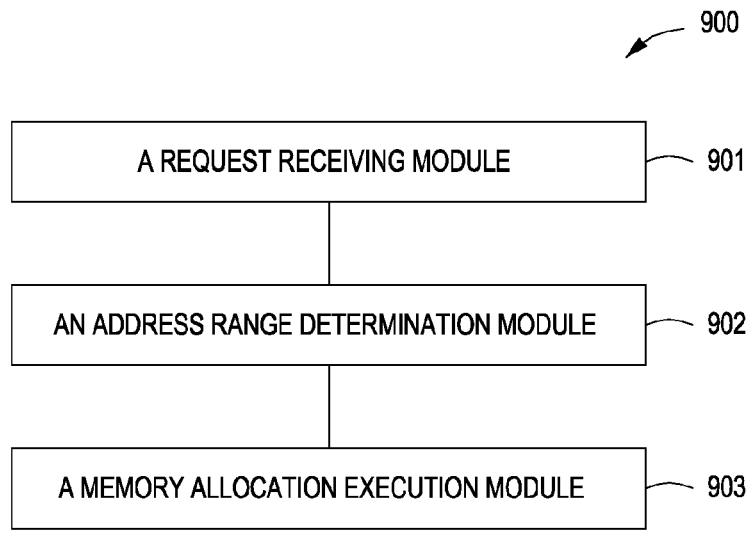
FIG. 9 is a block diagram of an exemplary apparatus for memory allocation by use of a multi-core processor in accordance with an embodiment of the present disclosure.

Referring to FIG. 9, a block diagram of an exemplary apparatus for memory allocation by use of a multi-core processor corresponding to the method of memory allocation described above and in accordance to an embodiment of the present disclosure is shown. As the embodiment of the apparatus is substantially similar to the embodiment of the method, the apparatus for memory allocation is illustrated herein with relative simplicity, with pertinent details described in the method embodiments above.

The apparatus 900 includes a request receiving module 901, an address range determination module 902, and a memory allocation execution module 903. The request receiving module 901 is configured for receiving a memory allocation request from a core of the multi-core processor. The address range determination module 902 is configure for, based upon a pre-determined policy for dividing the memory space into addresses for caching, determining an address range in the memory space from which the core is responsible for caching the data. And the memory allocation execution module 903 is configured for, based upon the amount of memory units to be allocated in the memory allocation request, allocating the corresponding amount of memory units to the core from the memory space corresponding to the address range.

Figure 10:
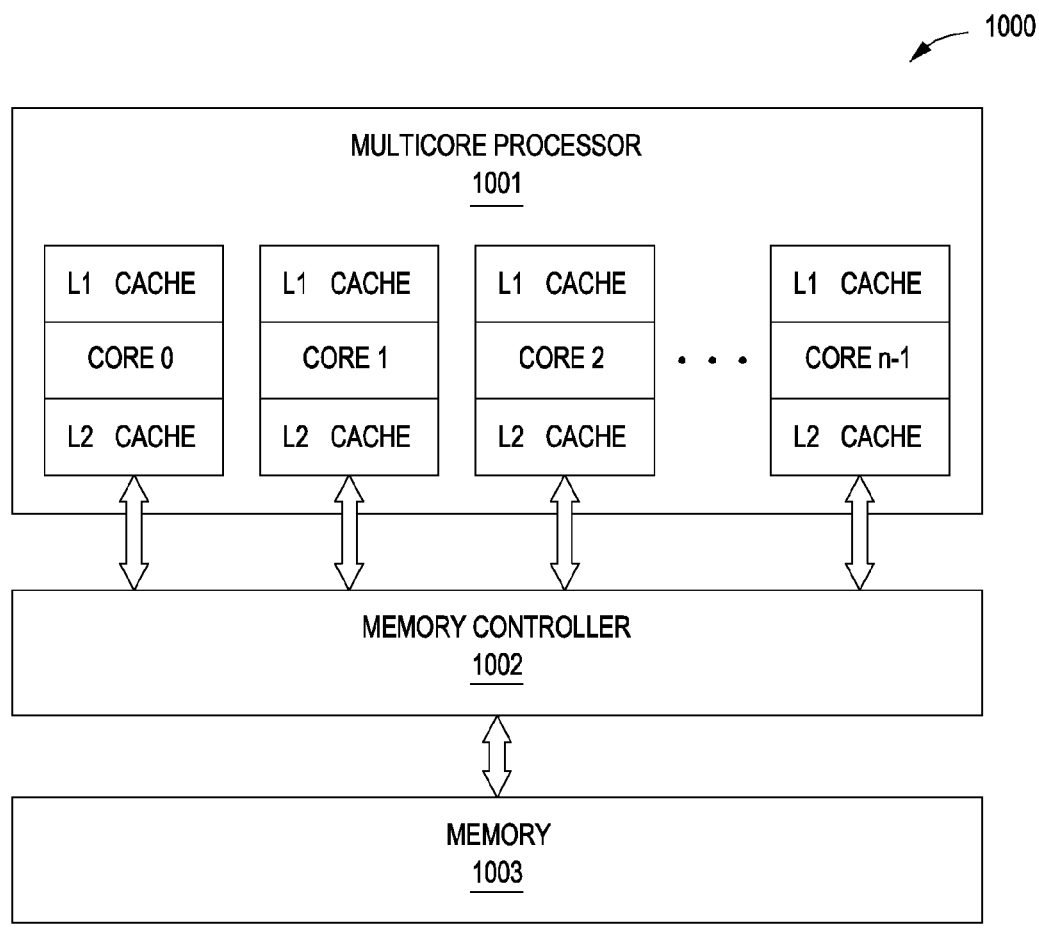
FIG. 10 is a block diagram of a system in accordance with an embodiment of the present disclosure.

Referring to FIG. 10, a block diagram of an exemplary system of a multi-core processor in accordance with an embodiment of the present disclosure is shown. The apparatus 1000 includes a cache consistency supporting multi-core processor 1001 as illustrated in the first embodiment described above, a memory controller 1002 coupled to a plurality of the cores of the multi-core processor for providing data from the memory space to the plurality of cores, and a memory 1003 coupled to the memory controller 1002, configured for storing data to be accessed by the cores.

The above described system 1000 does not include a last level cache that is shared by the cores, nor a cache index. Nevertheless, by use of the multi-core processor supporting cache consistency, a local cache of a core of the plurality of cores is responsible for caching data in a different range of addresses in a memory space and a core of the plurality of cores accesses data in a local cache of another core of the plurality of core via an interconnect bus. Therefore, cache data consistency and the sharing of the local caches amongst the cores is realized. Not only it solves the problem with the current techniques with regard to conflicts between private caches and shared caches, but also eliminating a cache index and the cache space consumed by the cache index to enhance data accessibility, increasing the overall system functionality by benefitting from the low data latency inherent to private caches.

In order to further enhancing data accessibility, a core of the apparatus 1000 accesses in the memory space memory sections at ranges of addresses corresponding to a local cache of the core. Pertinent details are as illustrated in the embodiments described above.

Figure 11:
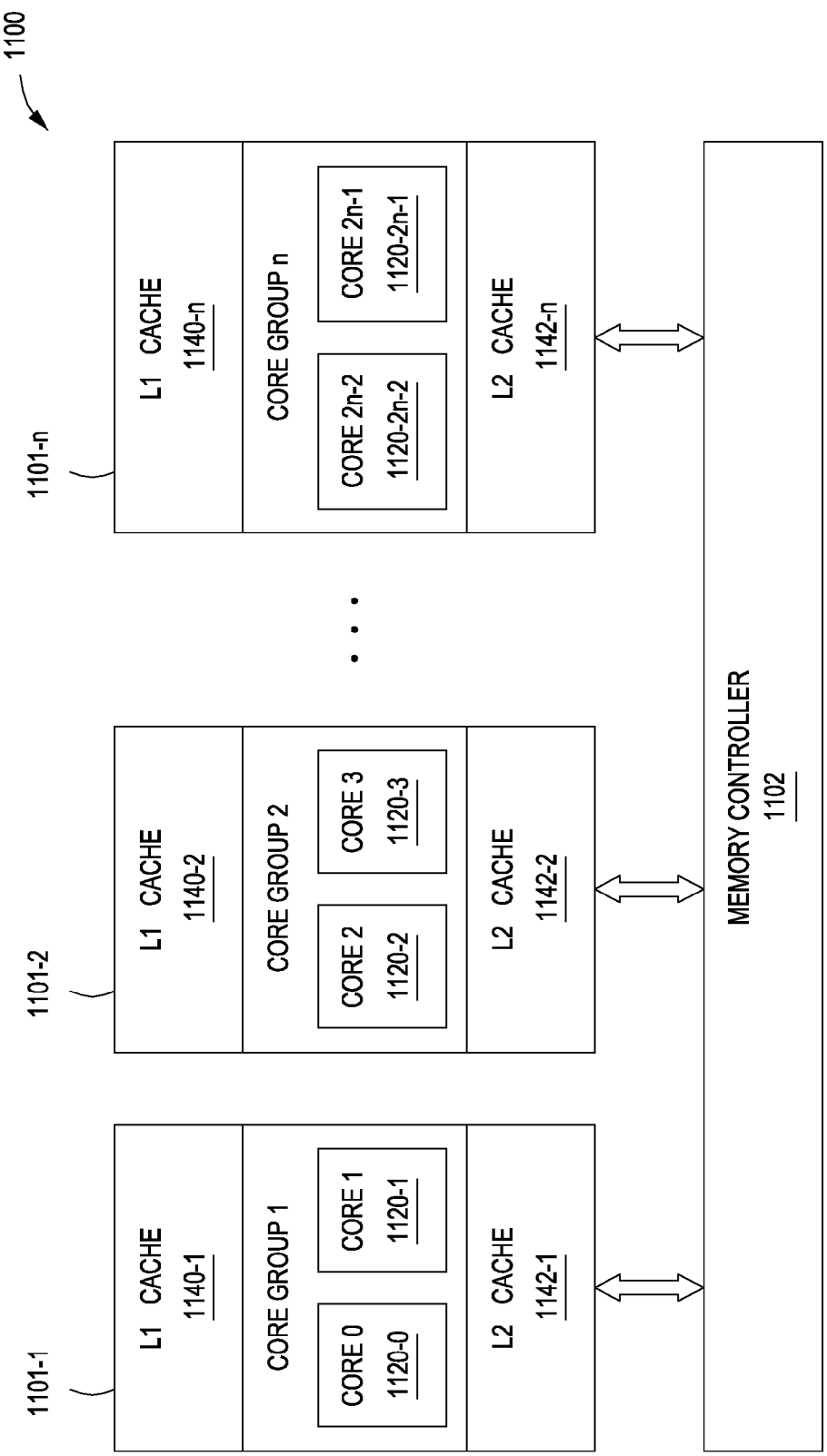
FIG. 11 is a block diagram of an exemplary system of a multi-core processor supporting cache consistency in accordance with an embodiment of the present disclosure.

Referring to FIG. 11, a block diagram of an exemplary multi-core processor supporting cache consistency in accordance with embodiments of the present disclosure is shown. The multi-core processor 1100 includes a plurality core groups 1101-1, 1101-2, . . . , 1101-n, which are divided from the plurality of cores 1120-0, 1120-1, 1120-3, 1120-4, . . . , 1120-2n−2, 1120-2n−1, where n being a natural number. In this example, each core group can include two cores, i.e., core group 1101-1 includes the cores 1120-0 and 1120-1, core group 1101-2 includes the cores 1120-2 and 1120-3, . . . , and core group 1101-n includes the cores 1120-2n−2, 1120-2n−1. Each core group also includes respective local caches: L1 cache 1140-1, 1140-2, . . . , 1140-n and L2 cache 1142-0, 1142-1, . . . , 1142-n. The multi-core processor can also include a memory controller 1102 for providing data from the memory. A local cache of a core group is responsible for caching data in a different range of addresses in a memory space and a core group accesses data in a local cache of another core group via an interconnect bus.

In the system of the instant multi-core processor embodiment, the plurality of cores are divided into n core groups. From the perspective of a core group, the cores of the same group share the same caches, including L1 cache and L2 cache. From the perspective of the core groups, the shared caches inside the core group are local caches of the core group. If a core group is considered as a virtual core, the instant embodiment is substantially similar to the first embodiment in theory, i.e., a local cache of a virtual core (a core group) is responsible for caching data in a different range of addresses in a memory space; and a virtual core (a core group) accesses data in a local cache of another virtual core (a core group) via an interconnect bus. Therefore, the above described methods of data reading, data writing and memory allocation by use of the multi-core processor of the first embodiment similarly apply to the multi-core processor of the instant embodiment.

The above described embodiment is merely an example, in implementations, the number of core groups of the processor, the number of cores in a core group, the number of levels of caches in a core group, and whether the memory controller is congregated inside the multi-core processor, can all be adjusted or configured under the circumstances accordingly.

In a typical apparatus, a computer system includes one or more CPU, I/O interfaces, network interfaces and memories. The memory can include computer readable medium implemented using, for example, non-permanent, random access memory (RAM), and/or no-volatile memory, such as Read Only Memory (ROM) or flash RAM. Memory is an exemplary computer readable medium.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is necessary to point out that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not of essence. The realized functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A processing system comprising:
a first CPU structure having a first core and a first cache that is coupled to the first core, the first cache to be assigned a first address range in a memory space; and
a second CPU structure having a second core and a second cache that is coupled to the second core, the second cache to be assigned a second address range in the memory space such that no copy of data stored in the first cache is to be stored in the second cache, and no copy of data stored in the second cache is to be stored in the first cache, the first and second caches being separate physical devices, the second core to:
generate a request to read data stored at a first address;
determine whether the first address lies within the first address range or the second address range without searching the second cache; and
send a request to the first core to read data from the first address when the second core determines that the first address lies within the first address range without searching the second cache.

2. The processing system of claim 1, wherein the first address range and the second address range are non-overlapping.

3. The processing system of claim 2, wherein the second core is to:
determine if valid data is stored at the first address when the first address lies within the second address range; and
read data from the first address when valid data is stored at the first address within the second address range.

4. The processing system of claim 3, wherein the second core is to:
output a load request to obtain a block of data from a main memory where the first address lies within the block of data when valid data is not stored at the first address within the second address range;
receive the block of data from the main memory;
store the block of data received from the main memory within the second address range; and
read data from the first address within the second address range after the block of data has been stored in the second address range.

5. The processing system of claim 2, wherein the first core is to:
receive the request sent by the second core;
determine if valid data is stored at the first address within the first address range in response to the request received from the second core;
read data from the first address within the first address range when valid data is stored at the first address within the first address range; and
transmit the data read from the first address within the first address range back to the second core.

6. The processing system of claim 5, wherein the first core is to:
output a load request to obtain a block of data from a main memory where the first address lies with the block of data when valid data is not stored at the first address within the first address range;
receive the block of data from the main memory;
store the block of data received from the main memory within the first address range; and
read data from the first address within the first address range after the block of data has been stored in the first address range.

7. The processing system of claim 2, wherein the second core is to:
generate a request to write data to a second address;
determine whether the second address lies within the first address range or the second address range without searching the second cache, and
send a request to the first core to write data to the second address when the second core determines that the second address lies within the first address range.

8. The processing system of claim 7, wherein:
the first cache includes a plurality of cache lines; and
the first core to mark a cache line with a dirty parity mark when the data to be written lies within the cache line.

9. The processing system of claim 7, wherein:
the second cache includes a plurality of cache lines; and
the second core to mark a cache line with a dirty parity mark when the data to be written lies within the cache line.

10. The processing system of claim 2 wherein the core includes a cache controller.

11. The processing system of claim 2, wherein an address range is assigned to a core by dividing a total memory address range by a number of cores to determine a plurality of continuous non-overlapping address ranges, and assigning a different continuous address range to each core.

12. The processing system of claim 11, wherein a lower boundary of the address range assigned to a core n is determined by MEM/N*n, and an upper boundary of the address range assigned to the core n is determined by MEM/N*(n+1)−1, where MEM is a capacity of a memory space and N is a total number of cores, n having a value ranging from 0 to N-1.

13. The processing system of claim 12, wherein a core determines which cache a memory address lies within with (A*N/MEM) mod N, where A is the memory address.

14. The processing system of claim 2, wherein each CPU structure includes two or more cores.

15. The processing system of claim 2 wherein the first cache includes a level 1 cache and a level 2 cache.

16. The processing system of claim 15, wherein each CPU structure includes two or more cores.

17. The processing system of claim 16, wherein the two or more cores in a CPU structure share the level 1 cache in the CPU structure.

18. The processing system of claim 17, wherein the two or more cores in a CPU structure share the level 2 cache in the CPU structure.

19. A method of operating a processing system, comprising:
generating a request to read data stored at a first address;
determining whether the first address lies within a first address range assigned to a first cache or a second address range assigned to a second cache without searching the first cache or the second cache, no copy of data stored in the first cache is to be stored in the second cache, and no copy of data stored in the second cache is to be stored in the first cache, the first and second caches being separate physical devices; and
sending a request to read data from the first address when the first address lies within the first address range.

20. The method of claim 19, wherein the first address range and the second address range are non-overlapping.

21. The method of claim 20, further comprising:
determining if valid data is stored at the first address when the first address lies within the second address range; and
reading data from the first address when valid data is stored at the first address within the second address range.

22. The method of claim 21, further comprising:
outputting a load request to obtain a block of data from a main memory where the first address lies with the block of data when valid data is not stored at the first address within the second address range;
receiving the block of data from the main memory;
storing the block of data received from the main memory within the second address range; and
reading data from the first address within the second address range after the block of data has been stored in the second address range.

23. The method of claim 20, further comprising:
determining if valid data is stored at the first address in response to the request to read data from the first address when the first address lies within the first address range;
reading data from the first address within the first address range when valid data is stored at the first address within the first address range; and
transmitting the data read from the first address within the first address range back to the second core.

24. The method of claim 23, further comprising:
outputting a load request to obtain a block of data from a main memory where the first address lies with the block of data when valid data is not stored at the first address within the first address range;
receiving the block of data from the main memory;
storing the block of data received from the main memory within the first address range; and
reading data from the first address within the first address range after the block of data has been stored in the first address range.

25. The method of claim 20, further comprising:
generating a request to write data to a second address;
determining whether the second address lies within the first address range or the second address range without searching the first cache or the second cache, and
sending a request to write data to the second address when the second address lies within the first address range.

26. The method of claim 25, wherein:
the first cache includes a plurality of cache lines; and
further comprising marking a cache line with a dirty parity mark when the data to be written lies within the cache line.

27. The method of claim 25, wherein:
the second cache includes a plurality of cache lines; and
further comprising marking a cache line with a dirty parity mark when the data to be written lies within the cache line.

* * * * *